United States Patent
Kuhn et al.

(10) Patent No.: US 7,234,216 B2
(45) Date of Patent: Jun. 26, 2007

(54) METHOD FOR SUPPORT CONTROL IN MACHINE TOOLS

(75) Inventors: Anton Kuhn, Dirlewang (DE); Richard Strobel, Sontheim (DE)

(73) Assignee: Grob-Werke GmbH & Co. KG, Industriestrabe, Mindelheim (DE)

( * ) Notice: Subject to any disclaimer, the term of this patent is extended or adjusted under 35 U.S.C. 154(b) by 19 days.

(21) Appl. No.: 11/002,897

(22) Filed: Dec. 3, 2004

(65) Prior Publication Data

US 2005/0160571 A1 Jul. 28, 2005

(30) Foreign Application Priority Data

Dec. 3, 2003 (DE) ................. 103 56 883

(51) Int. Cl.
*B23Q 17/00* (2006.01)
*G01M 19/00* (2006.01)
*B23C 9/00* (2006.01)

(52) U.S. Cl. .................. 29/33 P; 29/407.1; 29/714
(58) Field of Classification Search ............... 29/33 P; 408/56, 57, 59, 1 R; 409/135, 136; 73/37, 73/54.09, 54.14, 61.47, 61.78, 31.04; 451/8, 451/9; 91/435; 137/487.5; 269/329; 83/461, 83/169, 177
See application file for complete search history.

(56) References Cited

U.S. PATENT DOCUMENTS

| | | | | |
|---|---|---|---|---|
| 4,595,342 A | * | 6/1986 | Christlieb et al. ............. 417/45 |
| 4,742,651 A | * | 5/1988 | Wittstock ...................... 451/24 |
| 5,337,705 A | * | 8/1994 | Lane ........................ 123/41.33 |
| 5,951,216 A | * | 9/1999 | Antoun ......................... 408/56 |
| 6,280,291 B1 | | 8/2001 | Gromko et al. |
| 6,363,958 B1 | * | 4/2002 | Ollivier ........................ 137/2 |
| 6,463,667 B1 | * | 10/2002 | Ushio et al. .................. 33/502 |
| 6,810,718 B2 | * | 11/2004 | Wilson et al. ............. 73/54.01 |
| 6,874,977 B2 | * | 4/2005 | Cook et al. ................. 408/1 R |
| 7,100,639 B2 | * | 9/2006 | Rub ...................... 137/625.64 |

FOREIGN PATENT DOCUMENTS

| | | | | |
|---|---|---|---|---|
| DE | 2307046 | | | 9/1974 |
| DE | 4040919 A | * | | 6/1992 |
| DE | 4344264 | | | 12/1995 |
| DE | 19926946 | | | 12/1999 |
| DE | 10223592 | | | 12/2002 |
| DE | 10132857 | | | 1/2003 |
| DE | 10155135 | | | 5/2003 |
| EP | 1048926 | | | 11/2000 |
| EP | 1078713 | | | 2/2001 |
| EP | 1338374 | | | 8/2003 |
| EP | 1393854 | | | 8/2003 |

* cited by examiner

*Primary Examiner*—Dana Ross
(74) *Attorney, Agent, or Firm*—Jacobson Holman PLLC (57) ABSTRACT

Method for support control in machine tools where it is controlled whether an object is arranged correctly on a support surface in the machine tool, where a duct system is used which ends in the support surface, and conducts a medium, and can be pressurized, the final opening of the duct system is covered by the object, and in the duct system the pressure of the medium is reduced at a choke point, the differential pressure is determined before and after the choke point, and is evaluated for support control.

13 Claims, 4 Drawing Sheets

METHOD FOR SUPPORT CONTROL IN MACHINE TOOLS

FIELD OF THE INVENTION

The invention refers to a method for support control in machine tools, where it is controlled whether or not an object is arranged and/or clamped correctly on the support surface in a machine tool. The invention also refers to a device for support control to control the support of objects on a support surface, respectively on or in the clamping means of a clamping device of a machine tool, in particular in order to carry out the method.

BACKGROUND OF THE INVENTION

Methods, respectively devices, of this type are known. They are methods which are carried out by means of pneumatics according to the principle of impact pressure. An example for that is presented in FIG. 3. For that purpose in the machine tool a pneumatic duct system which can be pressurized is installed at the support spots, respectively rest spots. This pneumatic system has to be installed in addition to the, if necessary, present, coolant/lubricant duct systems. In the duct system a constant supply pressure is generated. This is done, for example, by means of a pressure control valve. A downstream orifice or choke generates a pressure drop in the duct system. The pressure is measured between orifice or choke, and the measuring surface where air outlet openings are provided through which the air can escape, if no work piece, tool, or the like is positioned there. The pressure between the orifice or choke, and the measuring surface, respectively measuring point, depends on the relation between the orifice or adjustment of the choke, and air gap between the support spots of the work pieces, respectively the rest pieces. The change of pressure resulting from that is collected electrically either directly or indirectly over a pneumatic limit value switch, and processed in the machine control. Depending on the volume of the duct and the required accuracy the indexing time changes.

As the support points, respectively rest points, for the work piece have to be clean all the time it is necessary to clean the rest surfaces continuously from chips which might be there. For that purpose additionally coolant or blast air is used. Therefore the duct system has always to be pressurized in order to prevent also the liquid from penetrating the measuring channels. The secure recognition of the support of an object on the support surface could reasonably, according to the required accuracy, only be realized with pneumatic duct systems which had to be provided, as already mentioned, additionally in support surfaces.

Because of the variable supply pressure in the systems working with the coolant/lubricant, the required accuracy could not be reached in the same way as it could be reached in pneumatically charged systems. In this respect there are no hydraulic systems for support control according to the prior art which work with sufficient accuracy and reliability.

In the prior art there is also a device for pneumatic position control known where, via a pneumatic duct system, the pressure is measured on a choke device in flow direction before and after this choke, and a difference pressure sensor collects the respective differential pressure. However, this is also a support control system already described before, which is equipped for measuring, respectively the support control itself, with an additional pneumatic duct system, and thus becomes very expensive.

Another pneumatic support control installation with a differential pressure sensor is known. This also works by means of a differential pressure, and the evaluation via a differential pressure sensor. For this pneumatic support control system also an additional pneumatic duct system is necessary in addition to the coolant, respectively flushing agent, system of the machine tool.

Another support control system is known from the state of the art which already works with a liquid medium. Here, however, the position of the work piece on a reference surface is determined by a position detector. It determines the position of the work piece because of the counterpressure and the distance. The production of this measurement is also extremely complicated. Additionally the detectors are quite prone to malfunctions because of the effects of humidity.

SUMMARY OF THE INVENTION

Departing from the state of the art described before it is an object of the invention to provide a method and a device by means of which a support control in machine tools should be improved in such a way that it works reliably, in particular if the pressure varies.

The invention departs from the state of the art described before, and suggests, in order to solve the problem, a method for support control in machine tools where it is controlled whether an object on a support surface in a machine tool is arranged correctly and/or clamped by means of a clamping device comprising a first and a second clamping means, where a duct system is used which ends in the support surface, respectively in the first clamping means, conducts a medium, and can be pressurized, the final opening of the duct system is covered by the object and/or the second clamping means, and in the duct system the pressure of the medium is reduced at a choke point, the differential pressure is determined before and after the choke point and is evaluated for the support control, which is characterized in that as medium the coolant/lubricant flushing of a machine tool is used. The solution according to the invention can even be carried out with varying and non-constant supply pressure. By determining the pressure difference the invention is independent from pressure variations. This is obtained by collecting the pressure before and after the choke point. This means, that the differential pressure is relevant and not the impact pressure principle. In the new method permanently the supply pressure, respectively the exit pressure, and thus the differential pressure is collected, processed and, according to the set parameters, transmitted, for example, to the machine control as an electric signal.

Existing coolant/lubricant duct systems may be used simultaneously also for the support control. This is independent from additional pneumatic components. The arrangement can be easily retrofitted into present hydraulic or even pneumatic cooling/flushing systems without additional pinning effort.

According to an advantageous development of the invention it is therefore provided that as a medium the filtered coolant/lubricant of a machine tool is used. This makes it possible now to use the hydraulic systems existing in most of the machines, like coolant or lubricant systems, for the support control. This reduces the effort for the support control altogether significantly. The installation of pressure sensors which permanently collect the pressure difference is easily possible, and also the permanent processing, respectively evaluation, by the sensors or a control can now be carried without any problems. Because of the incompressibility of liquids the arrangement of the sensors is even possible in some distance from the final opening, which is, in particular, an advantage compared with pneumatic support controls.

The method according to the invention for support control secures not only the control of the proper support of the object on the provided spot of the machine tool. Simultaneously, by means of this method, the clamping control may be carried out. That means, if a clamping device is provided on the machine tool, which has a first and a second clamping means which interact with each other for clamping the object, it is provided according to the invention to carry out the clamping control on at least one clamping means in such a way that the pressurized duct system, respectively the coolant/lubricant system ends in one of the clamping means. By means of that simultaneously a control of the proper positioning of the clamping device is possible. If, for example, one of the interacting clamping means is soiled, a gap will form between the object and the second clamping means, indicating that the clamping device is not positioned exactly as there is a gap between the object which has to be clamped, respectively the first clamping means, and the second clamping means, allowing coolant, respectively lubricant, to escape there which leads to a pressure drop. This changes the differential pressure, and it is either indicated or the control recognizes that the clamping process has not been carried out exactly. Therefore this results in two other advantages of the method according to the invention, namely first, it is recognized whether the object is positioned properly, respectively exactly, on the machine tool on the provided spot, and secondly, at the same time whether the object is properly clamped. The object may be, according to the invention, a work piece or good which has to be machined. Of course, the object may be also a pallet carrying a work piece on which the work pieces are fixed in the usual way.

Furthermore it is a characteristic of the invention that it may be used in existing machine tools with suitable duct systems for coolant, respectively lubricant, or air/coolant-flushing systems, and this is even subsequently. This makes it only necessary to retrofit certain connecting drillings, if possibly, and then to install a measuring system for differential pressure before and after a choke point which may be retrofitted also, if necessary. Such a retrofitting can actually be done very economically, and can, in particular, be combined with an existing machine control in such a way that a relatively small expense is necessary for the measuring of the differential pressure.

According to an advantageous development of the invention it is provided that at least one final opening of the duct system is provided in, respectively on, at least one clamping means for clamping the object, and is pressurized with the medium for support or clamping control.

According to another modification of the invention it has been found to be an advantage if the final opening of the duct system, the support surface, respectively clamping surface, is cleaned by the medium for a support, respectively clamping process. This may be controlled, for example, in such a way that a pressure impact is initiated before putting on, respectively clamping, in order to remove, if necessary, existing soils. Of course, a simple pump may be provided which then is activated one more time shortly before positioning, respectively clamping, in order to let coolant/flushing agent pass again on the support surface, respectively clamping surface, and thus remove existing soilings.

A method as described above is characterized, according to a development, in that at least one final opening of the duct system is provided in, respectively on, a clamping means, for example in openings for the engagement of clamping bolts, and they are flushed with the medium before or during the clamping process. By means of that also an improved positioning, an improved clamping, and, in particular, the control of both processes may be obtained.

According to the invention it has also been found that to be an advantage, if the object is lifted, if necessary, one more time for the positioning, respectively clamping, process if an inaccurate positioning and/or clamping has been stated in order to clean the support surface and/or the final opening and/or the clamping means with the medium, and that the positioning process, respectively the clamping process, is repeated after that. This is no problem in view of the control and the installation technique. The existing clamping devices in machine tools have, as a rule, suitable positioning means, respectively lifting means, in order to carry out the necessary movements. The machine control movements of this type can be controlled very easily.

Furthermore a development of the method according to the invention suggests that the differential pressure is collected, processed and used as signal for controlling a machine tool permanently.

Here it has turned out to be an advantage if the processing of the differential pressure is carried out in a control, preferably in the machine control of the machine tool. This modification according to the invention is always chosen if there is already a sufficiently capable machine control of the machine tool. Relatively simple pressure sensors may be used which transmit the corresponding values as signals, for example electric signals, to the machine control or the control.

Of course, it is also provided according to the invention that the processing of the differential pressure is carried out in at least one of the pressure sensors. Here an already intelligent pressure sensor is used which collects and processes both values of the pressure sensors. The result is that the determined value then does not have to be processed in a control or in the machine control, if there is one, or if there is no control, that the corresponding values are then, for example, indicated. However, this requires that at least one high quality pressure sensor is used as so-called master sensor in order to be able to realize this task.

Another aspect of the method according to the invention is given by the fact that the pressure, respectively the differential pressure, is set to a set point, and if it is reached, respectively fallen below, the control carries out a switch process, for example a change of signal. This makes an accurate determination possible whether or not an object rests on the support points, respectively the clamping means, respectively their correspondingly interacting surfaces, or whether or not the object is clamped exactly.

The method according to the invention is, according to a development, also characterized in that the supply pressure before the choke point is also evaluated. This permits, that it is permanently evaluated, because of the differential pressure which is between the first pressure sensor before the choke point, and the second pressure sensor after the choke point, which leads to a very high accuracy even with varying pressures, as they, for example exist, in a coolant duct system.

The method according to the invention is also characterized in that depending on the supply pressure and the differential pressure the control evaluates whether or not an object rests on the support surface, respectively clamping surface. This is, if necessary, then indicated also by corresponding switch processes or signal changes.

The method is, for example, carried out in such a way that the supply pressure is set as "make contact" to a certain value, and, if this value is reached, the control carries out a change of signal from "0" to "1", and the differential pressure as "break contact" is set to a certain lower value, and the control, if this value is not reached, carries out a second change of signal from "0" to "1". The control may be designed here as electric control so that the generated electric signals can be, for example, processed easily by a machine control. This circuit, respectively adjustment, leads to the following logic:

| Logic | signal 1 supply pressure | signal 2 differential pressure >0.08 bars |
| --- | --- | --- |
| No coolant/lubricant no work piece | "0" | "0" |
| coolant/lubricant > 2.5 bars No work piece | "1" | "0" |
| coolant/lubricant > 2.5 bars work piece accurate | "1" | "1" |

The circuit may be, for example, designed in such a way that in the coolant circuit a first sensor is arranged as a master sensor. In the sequence of the coolant duct system further on then the arrangement of a orifice is following for reducing pressure. Subsequently then the second pressure sensor follows as a simple pressure sensor. The duct system is then lead to the support system, comprising one or more support spots, or the clamping system, comprising one or more clamping spots, respectively clamping means. The support spots may not only be provided as direct support spot for a work piece. According to several preferred modifications it is, of course, also possible to provide the outlet openings at tool receivers, in particular at the spindle head of the machining spindle of a machine tool, indicating whether the tool itself or the spindle is positioned properly. If there is no such signal transmitted to the control, for example, it is deposited in the control that then the machine cannot carry out the machining process. Rather the positioning process has to be carried out anew, if necessary, after a flushing cleaning on the tool receiver. Only after the tool has been positioned properly the start of the machining process by the machine tool is carried out. Therefore the support surfaces or spots may also be seen as rest surfaces.

The simple pressure sensor and the master sensor are connected with each other, so that the master sensor can determine the pressure difference and transmit it as an electric signal to the control. By means of that a very simple and, nevertheless, effective support control, respectively clamping control, is provided which can be used independent from pressure variations of the supply pressure, as it occurs regularly in flushing or coolant circuits. It is guaranteed that the effort which results from the construction of an additional pneumatic duct system according to the state of the art, is completely unnecessary by the invention.

The method also permits a very high accuracy, and works without additional blowing air, for example for cleaning the support surfaces. If the pneumatic technique was used, it had to be adjusted exactly, which needed accordingly expensive adjustments. As the pneumatic systems were often prone to malfunctions, and frequently were even switched off unintended, further disadvantages of the system occurred. The availability of a support control system according to the state of the art was therefore limited.

The solution suggested now therefore permits a very simple and reliable method for carrying out a support and clamping control. The invention is also suitable for retrofitting a support control system in machine tools which have a coolant circuit, respectively a flushing agent circuit. It is not necessary there to drill additional channels for air.

Another advantage of the invention is also the fact that the measurements are now independent from the lengths of the ducts as the pressure existing in the liquid is eventually available for the liquid altogether to the same extent, because of the incompressibility of liquids in contrast to the compressibility of air. This is also the reason why the hydraulic support control in the hydraulic circuit can even be installed far away from the actual support surface, as the conditions after the support control do not change dramatically, as a rule. Such a procedure is almost impossible with pneumatic systems as in a relatively long channel, of course, air is compressed which leads to corresponding indexing times or inaccuracies.

The invention also provides a method, as described above, which is, according to a development, characterized in that the differential pressure in the duct system is used additionally or exclusively for determining the flow volume of coolant/lubricant. Departing from the knowledge that in particular in a system with strong variations of pressure as in a coolant/lubricant system, a measurement of the flow volume is very difficult to realize, here the pressure difference which is measured on the two sensors before and after the choke point, is used for determining whether sufficient coolant/lubricant reaches the tool, the tool spindle, respectively the work piece. By means of this it may, for example, be recognized whether there are malfunctions in the system. These may be, for example, soiling with chips at the outlet spots of the coolant/lubricant. Also malfunctions within the coolant system in the work piece, respectively the spindle, may now be recognized reliably by the method according to the invention.

A method as described before is, according to a development, characterized in that depending on the supply pressure and the differential pressure the flow volume of coolant/lubricant is determined and evaluated by the control, in the way whether or not a sufficient volume flow exists for cooling and/or lubricating the work piece, the spindle, respectively the tool.

A development of the method described in this way is characterized in that the control, respectively the machine control of the machine tool, evaluates the value(s) of the pressure difference in order to determine the flow volume of coolant/lubricant, and transmits, if a determined set point is fallen below, the resulting control commands to the machine tool.

A method aimed in particular to the measurement, respectively the determination, of the flow volume of coolant/lubricant is characterized, according to a development of the method described before, in that the work piece and/or the tool and/or the spindle are controlled and evaluated with reference to the flow volume of the coolant/lubricant, and corresponding control commands then are triggered by the control when a certain predefined set point is fallen below. These may be, for example, commands for stopping the spindle, respectively for flushing certain duct sections.

The methods for support control and for measuring the flow, respectively control the flow, may also be applied on their own and independently from each other, so that an independent protection can be claimed.

The problem of the invention is also solved by a support control device for the support control of objects on a support surface, respectively in or on clamping means of a clamping device of a machine tool, in particular for carrying out the method as described before, where in the support surface, respectively on at least one clamping means, a duct system, which can be pressurized and which ducts a medium, ends in at least one final opening, the final opening being covered by the object and/or a second clamping means interacting with the first clamping means, which is characterized in that the duct system is the coolant/lubricant duct system of the machine tool, and in the duct system a choke point, one pressure sensor before and one after the choke point is provided, and the differential pressure of the pressures determined by the pressure sensors is stated. Differing from the practice used so far, namely to determine an absolute pressure, it is now possible to measure the pressure difference of a first and a second pressure, and to use the resulting value for determining the support control, as well as the control of clamping. With a large drop of pressure in the duct system it is clear that the liquid can escape on the support opening. The pressure difference is then accordingly large. If the object the support of which is supposed to be controlled is positioned accurately, the pressure difference will be adjusted to a smaller value.

In this case it may be defined via the control that certain set points, for example the supply pressure and the differential pressure are predefined in order to be able to conclude the correct position, respectively clamping, of the object, for example work piece or tool.

In this connection it is in particular to be pointed out that all features and characteristics described with regard to the device, but also methods in the sense also with regard to the formulation of the method according to the invention can be transferred and, in the sense of the invention, also be used and are considered to be disclosed together with them. This goes also vice versa, which means that constructive, that means device, features only cited with regard to the method may also be taken into consideration in the frame of the device claims, and be claimed, and also count to the invention and disclosure.

For generating the pressure difference, according to a development of the support control device of the invention, at least one choke, orifice, nozzle, tube section, or the like is provided as choke point.

It is an advantage here, if at least one of the pressure sensors is designed as an intelligent pressure sensor, respectively as a so-called master pressure sensor, in such a way that it processes the values of the pressure collected by the two pressure sensors into values of the pressure difference, turns them into signals, and transmits them to the control of the machine tool or to a separate control. Such a support control device is always a possibility if the control has not enough capacity for processing the values, or if the control is not designed for turning the signals provided by the pressure sensors.

Of course, it is also possible to provide only two simple pressure sensors, one before and one after the choke point, which transfer their values of the determined pressure to the control, and the control carries out the processing and evaluation. This possibility exists always if there is a sufficiently dimensioned machine control which can process, without any problems, values provided by the support control system and/or clamping control system, respectively the support control device.

According to an advantageous development of the invention it is provided that the process pressure of the device is set in the low-pressure region up to 10 bars, preferably up to 2.5 bars. Thus expensive devices, respectively systems, for providing pressure are not necessary.

It is, in particular, possible to use the flushing systems, respectively coolant systems, working in the low-pressure region.

A support control device as described before is, according to a development, characterized in that a clamping device is provided with clamping means by means of which the object or a pallet carrying the object can be clamped, and at least one clamping means is connected with the duct system. By the connection of at least one clamping means with the duct system now, besides the support control, even a control of the proper clamping is possible. Besides the control whether the clamping process has been carried out correctly, of course, a control of a proper position of the corresponding clamping means of the clamping device is possible beforehand. This may, for example, be indicated by the fact that there still may be a certain drop in pressure during the positioning, which, however, may not exceed certain set points. If this is not the case the control of the machine tool may be designed in such a way that the clamping device is lifted once again, and the clamping means are, if necessary, cleaned again by a flushing shot. If the positioning is correct, and there is a soiling at the clamping surfaces of the clamping means it may nevertheless happen that the clamping device does not clamp the object correctly. This will be recognized also by the thus still existing gap because through this gap liquid may escape, and a drop in pressure, respectively another differential pressure, is determined. In this respect, by means of the support control according to the invention, not only a control of the proper support of the object, but also simultaneously a clamping control device, respectively support control device for the clamping means is provided. According to that a development of the invention is characterized in that at least one of the clamping means is provided on the object, respectively on the pallet carrying the object.

The final opening of the coolant duct system, respectively the flushing agent duct system, is provided, according to a development, at least in one of the clamping means for clamping the object.

The final opening may here either be provided in at least one clamping indentation as clamping means of the pallet carrying the object. In the same way it is, according to the invention, also provided to arrange the final openings of the duct system in at least one of the clamping bolts as clamping means of the clamping device.

For a proper connection of the duct system with the clamping system, respectively the clamping means, for example a sealing, sealing surfaces or a coupling, preferably an in-line quick coupling is provided in the duct system between the machine tool and the pallet, respectively the work piece. The sealing, respectively the sealing surfaces, are here possible in different embodiments. Thus, for example, a metal sealing by ground-in or polished surfaces are possible as well as a solution where a sealing is provided for one side or both sides of the surfaces which have to be sealed. Of course also a known coupling for such a duct system may be used for that purpose, preferably an in-line quick coupling. The invention is not restricted to such a sealing type. Rather all possible types of sealings are comprised by the invention.

The final opening is, according to a modification of the invention, designed like a nozzle. This has the effect that the coolant, respectively lubricant, can escape with corresponding pressure or correspondingly distributed, depending on the design of the supports, respectively the clamping surfaces.

Another aspect of the support control device according to the invention is given by the fact that a control is provided which collects the values of the pressure collected, respectively transmitted, by the pressure sensors as switch signals, and evaluates them. For example, the switch signals, as described above, can be given in a corresponding logic so that during the adjustment of the respective pressure the support control device indicates the corresponding values, and, if necessary, executes the commands belonging to that. As already mentioned, at least two modifications of the invention are possible, namely in such a way that two pressure sensors are designed as simple pressure sensors, and the control processes the values of the pressure difference, respectively evaluates them. It is also possible here to provide the machine control of the machine tool as control of the support control device, in such a way that it collects the values of the pressure sensors, evaluates them and, if necessary, transfers resulting control commands to the machine tool. The second modification is given by the use of a so-called master sensor, which is already able to carry out calculations, respectively evaluations, and to transmit them to the control or indication means.

Another aspect of the support control device according to the invention is given by the fact that the choke point, respectively means for reducing the pressure, respectively for changing the pressure, and the pressure sensors are arranged in the coolant circuit of the machine tool. This has the advantage that no additional systems for support control, respectively clamping control, have to be provided but existing systems can be used. For retrofitting, if necessary, only a support outlet opening on the support surface, respectively rest surface, has to be provided. This can be realized even for a relatively simple retrofit.

A development of the support control device, as described before, is characterized in that a shut-off valve is provided in the duct system on which the medium control acts, which is connected preferably with the machine door of the machine tool in such a way that the shut-off valve shuts off the duct system when the door is opened. This prevents coolant, respectively flushing liquid, from further escaping, or, if necessary, from splashing out of the machine tool, when the machine door is opened, or an entering user or maintenance person from being soiled, respectively injured. The shut-off valve is arranged preferably in the duct system after the second pressure sensor. This may prevent a larger loss of coolant, respectively flushing liquid.

The objects the support of which is supposed to be controlled are, according to the invention, a work piece which has to be machined, and/or the machining tool itself, and/or a dead stop because it always has to reach the same position.

Furthermore it is convenient if the support surface is arranged on a work piece receiver, a work piece carrier, or a tool receiver, in particular the spindle head of the machining spindle of a machine tool. For that purpose, if necessary, also the support surface has to be defined as a rest surface. This depends on the location of the surface, and on the location of the outlet openings for the liquid. If, for example, the correspondingly correct position of a machining spindle of a machine tool is checked this will be carried out on the rest surfaces of the spindle in the direction, for example, to the drive. If, in contrast to that, a tool receiver is equipped with a support control device, the outlet openings have to be arranged at the rest surfaces of the tool receiver for the tool.

In the same way it is, of course, provided that the support surfaces, respectively the rest surfaces, are arranged on a work piece carrier, respectively on the corresponding surfaces of a work piece receiver for support, respectively resting. The combination of several modifications is also subject of the invention.

For permanent cleaning and/or cooling of the support surfaces it is provided that a leakage gap is arranged on the support surface. This leakage gap makes a continuous escape of a part of the medium for cooling and flushing purposes possible. By means of this, if necessary, also the support surfaces, respectively the rest surfaces, may be cleaned.

A modification of the support control device according to the invention is characterized in that the leakage gap is provided at the junction point, respectively the support point, of the pallet carrying the work piece to the machine tool. This makes a support control device with leakage gap possible and also is the simultaneous conduction of the coolant, respectively the flushing liquid, respectively the lubricant, given.

According to the invention the duct system of the support control device serves at the same time as control device for support, respectively clamping, as well as the duct of coolant/flushing liquid as medium.

A support control device as described before, is, according to a development, characterized in that the duct system is connected with the tool spindle, and/or the work piece, and/or the tool, respectively the tool receiver, for determining the flow volume of coolant/lubricant. This ensures that besides the support control simultaneously also the sufficient flow volume of coolant/lubricant is controlled and monitored.

At the same time it is, however, also possible to realize the measurement of volume flow, respectively the control, and the support control independently from each other, for example by means of independently working devices, by means of which also may be reached an independent protection.

It is furthermore an advantage here if the control and/or at least one of the pressure sensors are designed in such a way that the flow volume of coolant/lubricant can be determined by means of the pressure difference and/or the supply pressure in the duct system by these.

The invention provides also a machine tool, in particular cutting machine tool, with a support control device, as described before.

BRIEF DESCRIPTION OF THE DRAWINGS

The invention is described in detail in the following by means of examples and drawings. In the figures.

DETAILED DESCRIPTION OF THE PREFERRED EMBODIMENT

Figure 1:
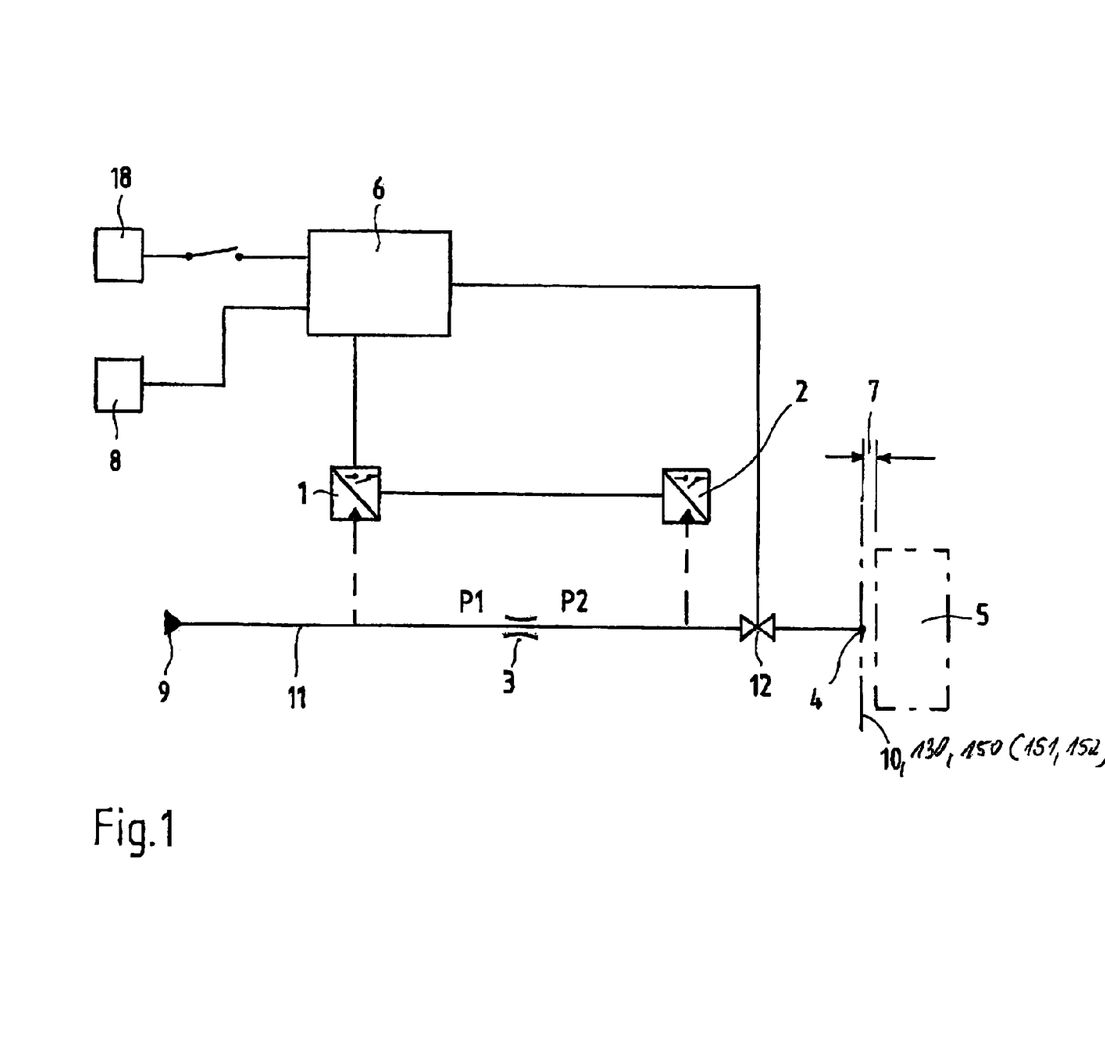
FIG. 1 is a schematic view of an embodiment of the invention as a modular mimic diagram.

FIG. 1 shows a schematic view of an embodiment of the invention as a modular mimic diagram. In the duct system 11 a choke point 3 is arranged which causes two pressures P1 and P2 in the duct system 11. In the duct system furthermore a shut-off valve 12 is arranged which is connected via a connection with the control. At the end of the duct system 11 in the support surface 10 the outlet opening for the liquid is positioned next to, respectively corresponding with, the object 5 the position of which has to be controlled. Reference number 9 indicates the generation of pressure for the duct system schematically. This may be, for example, a pump. In the duct system 11, before the choke point 3, the first pressure sensor 1, and, after the choke point 3, the second pressure sensor 2 is arranged. Both pressure sensors 1 and 2 are connected to each other via a connecting duct. One of either pressure sensor is here designed intelligently as a so-called master sensor which enables it to turn the collected values of the pressure into electric signals, and simultaneously to determine the pressure difference between the pressure sensor 1 and the pressure sensor 2 and to transmit it to the control 6.

The control 6 is, as already mentioned, connected with the shut-off valve 12. The shut-off valve 12 is activated, for example, when the machine door is opened. This is schematically shown with the switch symbol. This is supposed to prevent coolant/lubricant from escaping when the machine door is opened. Another connection is provided from the control to the tool spindle. This is selected if, for example, the pressure sensors, respectively the control, recognises that the object 5, respectively the work piece, is not positioned properly. The tool spindle is then not released for the machining movement, but only when the object 5 is in the exactly predetermined position, and thus the final opening 4 is, at least partly, closed.

In the shown example a leakage gap 7 is provided on the support surface. However, this is not really necessary in the invention, only then when permanently a part of the coolant/lubricant shall escape from the duct system. This may happen, for example, for cooling and lubricating purposes, but also for cleaning purposes. The object 5, however, may be positioned accurately on the support surface 10, if this leakage gap 7 is not provided. It can be seen clearly that the duct system 11 may be here at the same time the coolant/lubricant system of the machine tool. No additional duct, respectively no additional duct system, is needed for a support control. It is only necessary to arrange the pressure sensors before, respectively after the choke point, and, if necessary, to connect a final opening 4 in an existing support system with the coolant/lubricant system. Therefore also a retrofitting of a machine tool with a coolant/flushing liquid circuit may be realized quite simply.

The connection to the control of the machine tool is a preferred modification of the invention. However, it is, in the same way, also possible to provide a separate control which carries out only the function of the control indicated here of the tool spindle of the machine door, respectively of the shut-off valve, and provides, if necessary, the generating of pressure.

Figure 2:
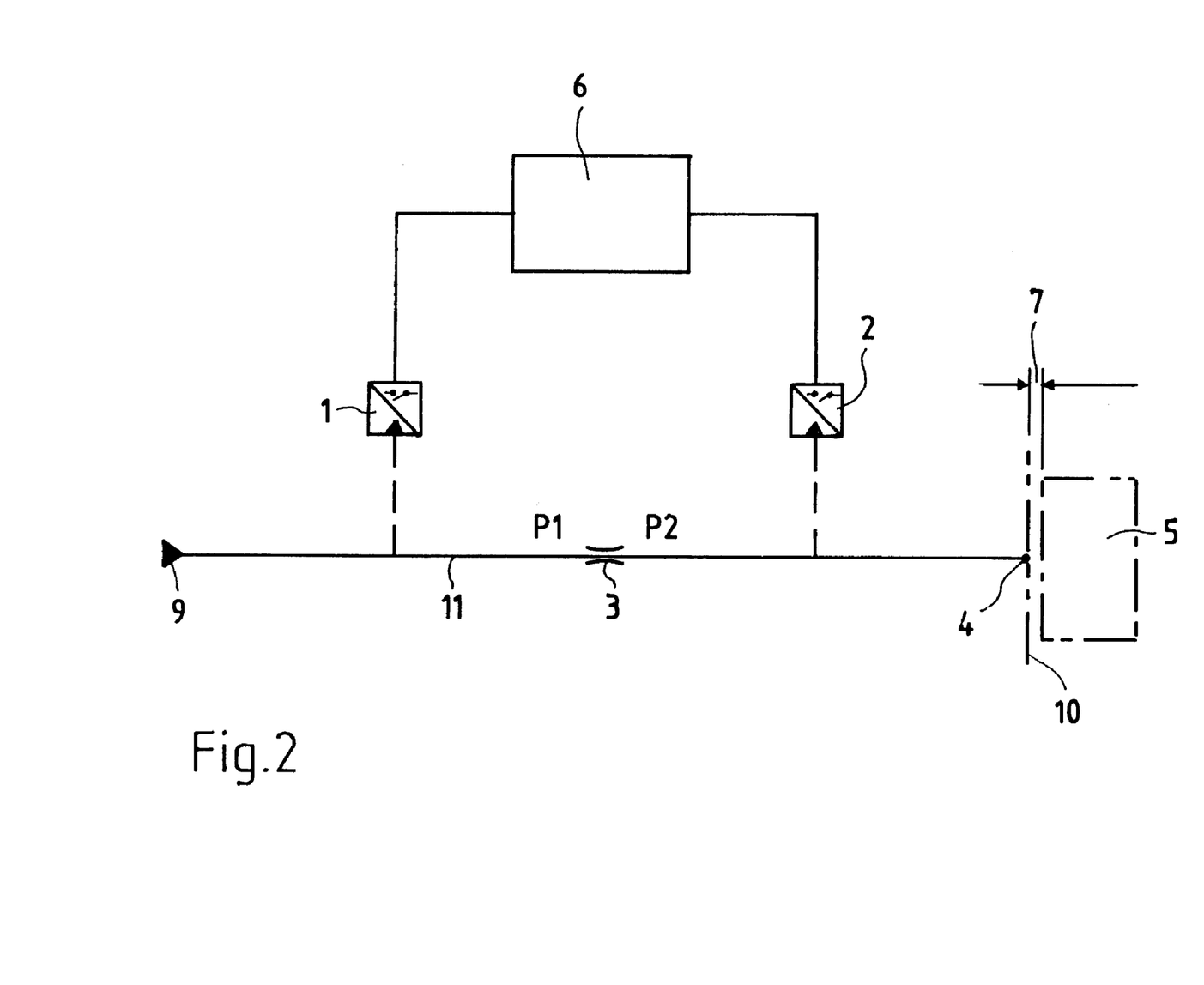
FIG. 2 is an embodiment of the invention.

FIG. 2 shows another embodiment of the invention. The significant difference to the modification shown in FIG. 1 is given by the fact that both pressure sensors 1 and 2 are designed similarly as simple sensors. The signals of the values of the pressure transmitted by the sensors are processed in control 6. This is the only significant difference compared with the embodiment according to FIG. 1. All other features may also be provided in the same way also in the embodiment according to FIG. 2. This goes, for example, for the shut-off valve, and the connection to the control, respectively the machine door, or the connection to the control of the tool spindle. In the same way also positioning of an object, for example of the work piece 5, is described. The final opening 4 is also located in the support surface 10, and it may be provided in another embodiment of the invention that a leakage gap 7 is provided between support surface 10 and one of the sides of the object which has to be positioned.

Figure 3:
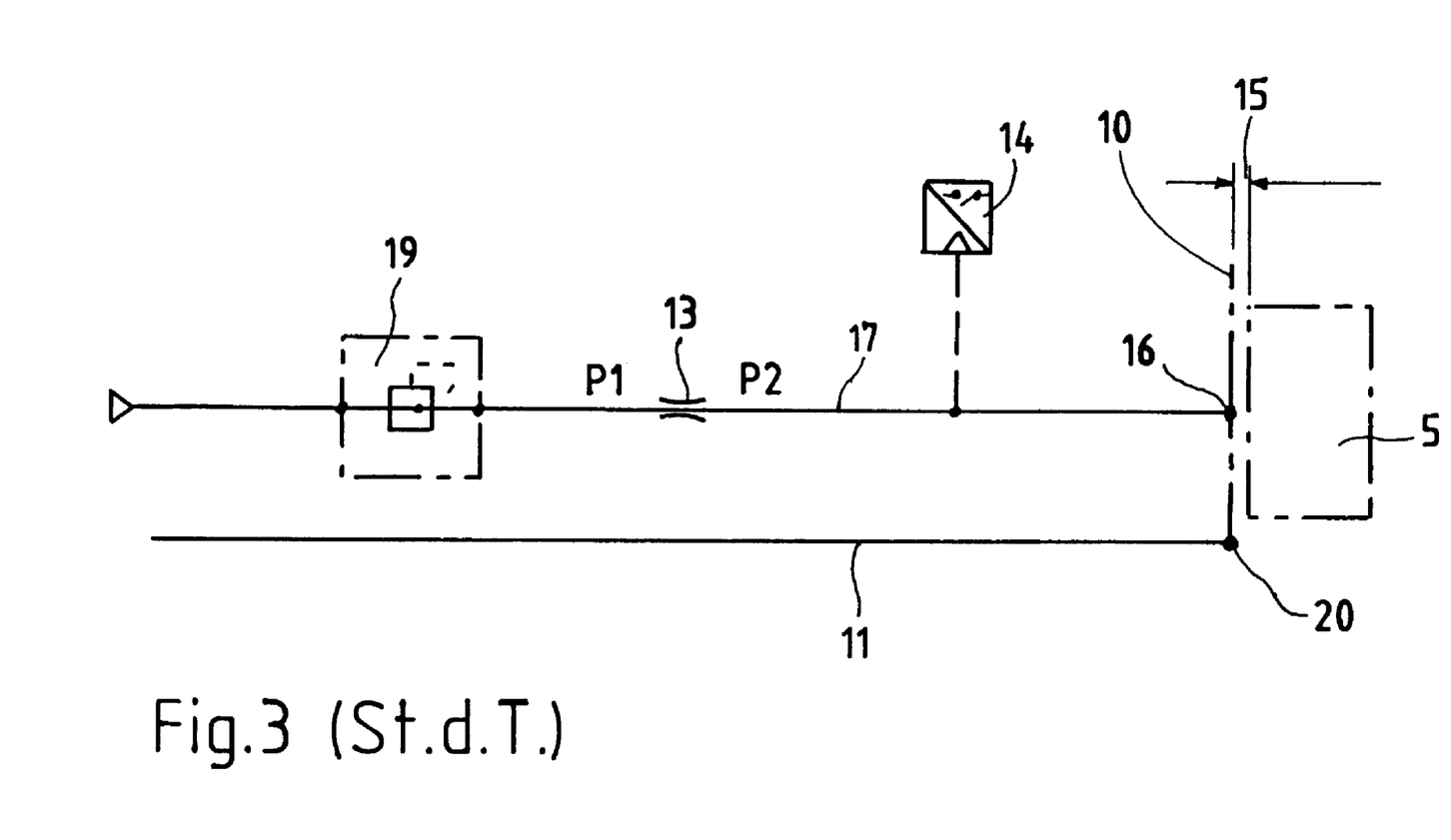
FIG. 3 is a view of an example of the state of the art.

FIG. 3 shows an example of the state of the art. It is clear here that, besides the duct system for coolant, respectively flushing liquid 11, another duct system 17 is provided for the support control. This is, according to the state of the art, designed as a purely pneumatic system. Reference number 19 indicates a pressure reducing valve which provides the necessary pressure for the system. It is here a task of the valve to keep the pressure P1 constant. In the pneumatic duct system 17 a choke point 13 is provided in the same way as according to the embodiment of the invention. However, there is only one pressure sensor 14 here which measures the absolute pressure in the duct system 17 as impact pressure, and transmits it, if necessary, to a control which is not shown in the example according to the FIG. 3. Parallel to the duct system 17 the duct system 11 is shown which concerns the coolant and lubricant system. The final opening 20 of this duct system is located in the support plane, respectively on the support surface 10, as well as the final opening 16 of the support pressure control in this drawing. The reference number 15 indicates the leakage gap through which permanently compressed air has to escape in order to prevent flushing liquid or coolant from penetrating into the duct system 17, and which, at the same time, serves for cleaning the support surface, respectively the rest surface 10.

Figure 4:
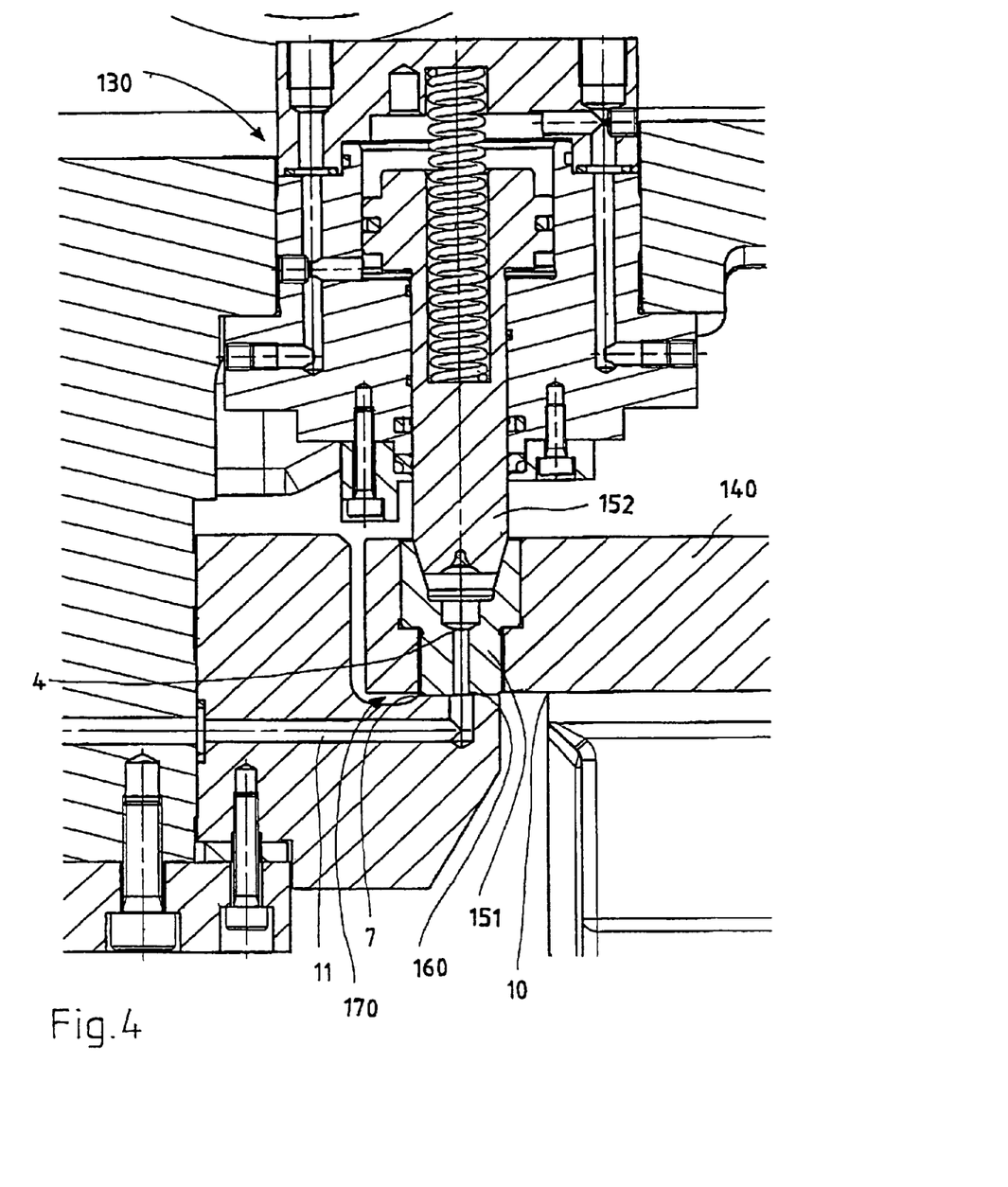
FIG. 4 is a detail of another embodiment of the invention.

FIG. 4 shows a detail of another embodiment of the invention. It is provided here to arrange the object 5, respectively a pallet 140 carrying the object 5, on the support surface 10. The duct system 11 is located in the machine tool, for example in the support table. The machine tool, according to the embodiment of FIG. 4, has a clamping device 130. This is indicated schematically by an arrow. The clamping device 130 comprises, among others, clamping indentations 151 provided in the pallet 140, into which a clamping bolt 152 engages for clamping. If the clamping bolt 152 is arranged correctly in the clamping opening 151 (as shown), the clamping bolt is clamped, and thus the work piece, respectively the object, pressed onto the pallet. The duct system 11 runs into the clamping indentation 151 below the pallet. The final opening 4 of the duct system 11 is provided there. According to a modification of the invention it is furthermore provided that the final opening 4 is designed nozzle-like. At the junction point, where the clamping indentation 151 is arranged, which is arranged in the pallet 140, which is positioned corresponding to the duct system, an in-line quick coupling 160 is provided. It may be given, for example, by grounded, self-sealing surfaces. Of course, it is also possible to provide there suitable sealing means, like O-rings, lip sealings, or the like. The leakage gap 7 is located at the junction point 170, respectively the support spot of the pallet 140 carrying the object 5. The support control device now uses the clamping device simultaneously as support control and control of the clamping process. The advantage of this modification is that by means of the flushing liquid, respectively coolant, if the positioning is not correct, in particular during the clamping, respectively positioning process, the rest surfaces for the clamping bolt are cleaned. By means of that escaping flushing liquid, respectively coolant, can be conducted, for example, via the leakage gap 7. If the clamping device, respectively the pallet, is positioned correctly, this is, of course, indicated by the support control, respectively it is signaled to the control accordingly. If this is not the case, the clamping, respectively positioning process, is stopped, the clamping device in the upper part with the clamping bolt 152 is lifted again, and, if necessary, again the pressure of the flushing system, respectively coolant system, is raised, in order to remove soilings which may be in the clamping opening 151 by flushing, respectively to remove them from the clamping bolt 152. Of course, also a reversion of the system is possible, in such a way that the coolant, respectively the flushing liquid, is ducted to or through the clamping bolt 152 in order to clean then from there the clamping bolt 152 and the clamping opening 151. The advantage of this modification is that, besides a support control, at the same time the clamping can be controlled. Only if the clamping bolt is positioned correctly in the clamping opening 151, and the clamping has been carried out, for example, the duct system 11 is locked off, so that, if necessary, this may possibly be indicated by the indication device, respectively collected by the control and signaled. In this respect this modification is in particular suitable to provide, besides measurements saving expenses by saving an additional support control duct system, a considerable safety of the positioning and clamping process for the work piece which has to be machined, respectively the object, which has to be clamped.

From the explanations above the disadvantages of the state of the art in contrast to the modifications described in the embodiments of the invention can be discerned clearly. Summed up, there are the following advantages:

The support control according to the invention operates with the same coolant/lubricant which is also used for flushing the support and is therefore present.

Support control according to the invention may also operate with oil as coolant/lubricant.

The support control according to the invention does not cause nebulizing of coolant or oil.

The device for support and clamping control provided by the new method and device has high availability and interrogation reliability.

The support control device according to the invention can be retrofitted, if requested, even in older machines, which do not yet have a support or clamping control system.

The new method and the new support control device are independent from duct lengths as the coolant is incompressible.

By means of the incompressibility the new support control system is significantly faster than previous pneumatic support control systems.

According to the invention individual work piece supports with particular pinnings are not necessary, resulting in less modifications of supports. Altogether, by means of this, production is simplified, the supply with spare parts and storing is rationalized.

The new support and clamping control is not sensitive to coolant, therefore it is, for example, not necessary to provide "permanent blasting air" which has to prevent coolant from penetration into the pneumatic duct system according to the state of the art.

Additionally no or small amounts of compressed air are necessary so that the use of compressed air can be reduced altogether. Furthermore the new support and clamping control makes considerably less noise than the previous one. This is caused by avoiding blowing noises. A lower sound level (dB(a) value) is obtained.

Although the invention has been described by exact examples which are illustrated in the most extensive detail, it is pointed out that this serves only for illustration, and that the invention is not necessarily limited to it because alternative embodiments and methods become clear for experts in view of the disclosure. Accordingly changes can be considered which can be made without departing from the contents of the described invention.

The invention claimed is:

1. Method for support control in a machine, said method comprising the steps of
controlling the machine regardless of whether an object is one of (1) placed correctly on a support surface and (2) clamped by a clamping device, the clamping device including a first and a second clamping means,
using a duct system which ends in one of the support surface and the first clamping means,
conducting a medium in the duct system, the medium being pressurizeable,
covering a final opening of the duct system by at least one of the object on the support surface and the second clamping means,
reducing pressure of the medium in the duct system at a choke point,
determining a differential pressure of the medium before and after the choke point,
evaluating the differential pressure of the medium for the control of the machine, the medium in the duct system being one of (1) a cooling lubricating liquid, (2) an air coolant mixture and (3) air, and
using a pre-existing duct system having one of a cooling lubricating liquid system, air coolant mixture, or air rinsing system for the machine.

2. Method according to claim 1, wherein the final opening of the duct system is cleaned by the medium for a support process.

3. Method according to claim 1, wherein rinsing of a clamping bolt located in the final opening of the duct system is done before or during a clamping process with the medium of the duct system.

4. Method according to claim 1, wherein the differential pressure is used as a signal for the control of a machine tool.

5. Method according to claim 4, wherein processing of the differential pressure is carried out in a machine control of the machine tool.

6. Method according to claim 4, wherein processing of the differential pressure is carried out by at least one pressure sensor.

7. Method according to claim 1, wherein the differential pressure is used as a signal for controlling a machine tool, and the differential pressure is set to a set point, and an operation is carried out dependent upon a relationship of the differential pressure and the set point.

8. Method according to claim 1, wherein the differential pressure is used as a signal for controlling a machine tool, and supply pressure of the medium before the choke point is also evaluated.

9. Method according to claim 1, wherein the differential pressure is used as a signal for controlling a machine tool, and processing of the differential pressure is carried out in a machine control of the machine tool, and the signal is evaluated depending on supply pressure and the differential pressure by the machine control, whether an object rests at least one of the support surface and at least at one of the clamping means.

10. Method according to claim 1, wherein the differential pressure in the duct system is used additionally or exclusively for determining flow volume of coolant/lubricant.

11. Method according to claim 1, wherein processing of the differential pressure is carried out in a machine control of a machine tool, and, depending on supply pressure of the medium and the differential pressure, flow volume of the coolant/lubricant is determined and evaluated by the machine control, dependent on whether there is either a sufficient volume flow for at least one of cooling and lubricating of the work piece or the machine tool.

12. Method according to claim 1, wherein processing of the differential pressure is carried out in a machine control of the machine tool, and the machine control of a machine tool evaluates a value of a pressure difference for determining flow volume of coolant/lubricant, and, if the value falls below a defined set point, transmits resulting control commands to the machine tool.

13. Method according to claim 1, wherein processing of the differential pressure is carried out in a machine control of a machine tool, and, depending on supply pressure and the differential pressure, flow volume of coolant/lubricant is determined and evaluated by the machine control.

\* \* \* \* \*